United States Patent
Ovshinsky et al.

(10) Patent No.: US 6,960,406 B2
(45) Date of Patent: *Nov. 1, 2005

(54) ELECTRODE UTILIZING FLUORINATED CARBON

(75) Inventors: Stanford R. Ovshinsky, Bloomfield Hills, MI (US); Srinivasan Venkatesan, Southfield, MI (US); Hong Wang, Troy, MI (US); Boyko Aladjov, Rochester Hills, MI (US); Subhash Dhar, Bloomfield, MI (US)

(73) Assignee: Texaco Ovonic Fuel Cell LLC, Rochester Hills, MI (US)

( * ) Notice: Subject to any disclaimer, the term of this patent is extended or adjusted under 35 U.S.C. 154(b) by 436 days.

This patent is subject to a terminal disclaimer.

(21) Appl. No.: 10/273,499

(22) Filed: Oct. 18, 2002

(65) Prior Publication Data

US 2004/0076879 A1 Apr. 22, 2004

(51) Int. Cl.$^7$ ............................................... H01M 4/86
(52) U.S. Cl. ............................. 429/40; 429/41; 429/42; 429/44; 204/284
(58) Field of Search .................... 429/27, 40–42, 429/44, 218.2; 204/290.03, 290.04, 290.05, 290.06, 290.07, 283, 284, 294, 290.4, 218

(56) References Cited

U.S. PATENT DOCUMENTS

| | | | | |
|---|---|---|---|---|
| 3,791,896 A | * | 2/1974 | Sklarchuk | 429/42 |
| 5,536,379 A | | 7/1996 | Nonaka et al. | |
| 6,068,921 A | | 5/2000 | Yamana et al. | |
| 6,280,870 B1 | | 8/2001 | Eisman et al. | |
| 6,620,539 B2 | * | 9/2003 | Ovshinsky et al. | 429/27 |
| 6,777,125 B2 | * | 8/2004 | Ovhsinsky et al. | 429/27 |
| 6,835,489 B2 | * | 12/2004 | Venkatesan et al. | 429/40 |
| 2004/0053109 A1 | * | 3/2004 | Ovshinsky et al. | 429/40 |

* cited by examiner

*Primary Examiner*—Gregg Cantelmo
(74) *Attorney, Agent, or Firm*—Frederick W. Mau, II; David W. Schumaker; Marvin S. Siskind

(57) ABSTRACT

A fluorinated carbon based gas diffusion layer for use in hydrogen and oxygen electrodes. The fluorinated carbon based gas diffusion layer provides for uniform distribution of hydrogen or oxygen across the electrode while maintaining a high level of hydrophobicity within the gas diffusion layer.

21 Claims, 3 Drawing Sheets

ELECTRODE UTILIZING FLUORINATED CARBON

FIELD OF THE INVENTION

The present invention generally relates to fuel cells and batteries into which electrodes are used. More particularly, the present invention relates to electrodes utilizing fluorinated carbon to increase hydrophobicity within the gas diffusion layer of the electrodes while maintaining the pore structure within the gas diffusion layer.

BACKGROUND

As the world's human population expands, greater amounts of energy are necessary to provide the economic growth all nations desire. The traditional sources of energy are the fossil fuels which, when consumed, create significant amounts of carbon dioxide as well as other more immediately toxic materials including carbon monoxide, sulfur oxides, and nitrogen oxides. Increasing atmospheric concentrations of carbon dioxide are warming the earth; bringing about global climatic changes. Energy-producing devices which do not contribute to such difficulties are needed now.

A fuel cell is an energy-conversion device that directly converts the energy of a supplied gas into an electric energy. Highly efficient fuel cells employing hydrogen, particularly with their simple combustion product of water, would seem an ideal alternative to current typical power generations means. Researchers have been actively studying such devices to utilize the fuel cell's potential high energy-generation efficiency.

Fuel cells, like batteries, operate by utilizing electrochemical reactions. Unlike a battery, in which chemical energy is stored within the cell, fuel cells generally are supplied with reactants from outside the cell. Barring failure of the electrodes, as long as the fuel, preferably hydrogen, and oxidant, typically air or oxygen, are supplied and the reaction products are removed, the cell continues to operate.

Fuel cells offer a number of important advantages over internal combustion engine or generator systems. These include relatively high efficiency, environmentally clean operation especially when utilizing hydrogen as a fuel, high reliability, few moving parts, and quiet operation. Fuel cells potentially are more efficient than other conventional power sources based upon the Carnot cycle.

The major components of a typical fuel cell are the hydrogen electrode for hydrogen oxidation and the oxygen electrode for oxygen reduction, both being positioned in a cell containing an electrolyte (such as an alkaline electrolytic solution). Typically, the reactants, such as hydrogen and oxygen, are respectively fed through a porous hydrogen electrode and a porous oxygen electrode and brought into surface contact with the electrolytic solution. The particular materials utilized for the oxygen electrode and hydrogen electrode are important since they must act as efficient catalysts for the reactions taking place.

In an alkaline fuel cell, the reaction at the hydrogen electrode occurs between the hydrogen fuel and hydroxyl ions ($OH^-$) present in the electrolyte, which react to form water and release electrons:

$$H_2 + 2OH^- \rightarrow 2H_2O + 2e^- \; (E_0 = -0.828 \text{ v}).$$

At the oxygen electrode, the oxygen, water, and electrons react in the presence of the oxygen electrode catalyst to reduce the oxygen and form hydroxyl ions ($OH^-$):

$$O_2 + 2H_2O + 4e^- \rightarrow 4OH^- \; (E_0 = -0.401 \text{ v}).$$

The total reaction, therefore, is:

$$2H_2 + O_2 \rightarrow 2H_2O \; (E_0 = -1.229 \text{ v}).$$

The flow of electrons is utilized to provide electrical energy for a load externally connected to the hydrogen electrode and oxygen electrode.

In order to achieve high current densities, most of the fuel cells operating at ambient or near ambient conditions utilize high surface area electrodes. In such electrodes, carbon plays a very important role. Carbon has as least one or more orders of magnitude higher surface area compared to the other traditionally used materials. Carbon is also relatively inexpensive, chemically stable, and inert to most electrolytes. Generally, by varying the starting materials and the processing conditions, it has been possible to produce a variety of carbons with varying surface areas.

Fuel cell electrodes have a gas diffusion layer that is permeable to gases such as hydrogen and oxygen and an active layer which is in contact with the electrolyte. In the hydrogen electrode, hydrogen gas passes through the gas diffusion layer and is uniformly distributed to the active layer of the hydrogen electrode. The active layer dissociates the hydrogen, absorbs the hydrogen and reacts the hydrogen at the electrolyte interface. In the oxygen electrode, oxygen enters the gas diffusion layer and is adsorbed. The adsorbed oxygen is then distributed to the active layer where the oxygen is reacted at the electrolyte interface.

One of the biggest problems facing fuel cell development is the tendency of the electrodes to "flood" over the life time of the fuel cell. In other words, electrolyte penetration into the bulk of the electrode leads to a loss of active catalyst area, usually resulting in a poor performance of the fuel cell. With this in mind, the gas diffusion layer is designed to be highly hydrophobic. Since the gas diffusion layers are not directly involved in the current collection and cannot tolerate any flooding, they are designed to have higher hydrophobic content as compared to the other layers of the electrodes. The active layer (AL) where electrochemical reactions take place and where lower resistance is desired, the electrode is made less hydrophobic. Hydrophobicity is introduced by coating the carbon in the gas diffusion layer with polytetrafluoroethylene.

The gas diffusion layer is a porous matrix that distributes the hydrogen or oxygen in a uniform manner across the entire face of the respective electrode surfaces. Porosity and pore structure are important in this layer whereas surface area is of only secondary importance unlike the active layer. Typically, the oxygen electrochemical reduction kinetics is very slow depending strongly on the applied current density. To minimize the polarization, the oxygen electrode is operated at low current densities. Operation at low current densities (with reasonably good power output) is achieved by increasing the total surface area while keeping the same geometrical area. So the carbon particles used for the active layer usually have higher surface areas.

The process by which the carbon particles are coated with polytetrafluoroethylene results in partial covering of the carbon particles. Subsequently when they are compacted in a hydraulic press or in a roll mill (sometimes with a post sintering operation) the polytetrafluoroethylene gets stretched and forms a network holding the carbon particles in its matrix. During the operation in a full cell mode over a long operational time, the electrodes gradually begin to "flood" and the performance goes down. The hot electrolyte may gradually undermine the polytetrafluoroethylene coating thus rendering the electrode vulnerable to flooding. Increasing the polytetrafluoroethylene content to prevent "flooding" is not an answer as it tends to "gum up" and the pores become closed. On the active layer side, increased polytetrafluoroethylene increases the resistance within the electrode. Use of a material in the gas diffusion layer with built in hydrophobic properties would enable the gas diffusion layer to remain hydrophobic even when the polytetrafluoroethylene is undermined by the electrolyte solution. The use of a material in the gas diffusion layer with built in hydrophobic properties would also allow the amount of polytetrafluoroethylene in the gas diffusion layer to be reduced thereby increasing the porosity of the gas diffusion layer.

The present invention discloses electrodes incorporating a fluorinated carbon. The fluorinated carbon has a built in hydrophobic property which reduces the amount of polytetrafluoroethylene in the electrode. The fluorinated carbon enables the gas diffusion layer of the electrode to remain hydrophobic even after the polytetrafluoroethylene has begun to wear away. Electrodes produced using the fluorinated carbon exhibit excellent hydrophobic characteristics where needed in the electrodes and have a life time longer than those currently available.

SUMMARY OF THE INVENTION

The present invention discloses an electrode, for use in a fuel cell or a battery, comprising a fluorinated carbon based gas diffusion layer having a built in hydrophobicity and an active material layer adjacent to the gas diffusion layer wherein the active material layer comprises a) a hydrogen storage material adapted to dissociate and absorb gaseous hydrogen or b) a carbon matrix impregnated with a redox couple selected from the group consisting of a $Co^{+2}$—$Co^{+3}$ couple, a $Co^{+2}$—$Co^{+4}$ couple, a $Ni^{+2}$—$Ni^{+3}$ couple, a $Ni^{+2}$—$Ni^{+4}$ couple, a Ag—$Ag^+$ couple, a Ag—$Ag^{+2}$ couple, a Cu—$Cu^{+2}$ couple, a $(Ni/Ag)^{+2}$—(Ni/Ag) couple, a $(Ni/Fe)oxide^{+2}$-$(Ni/Fe)oxide^{+3}$ couple, a $Mn^{+2}$—$Mn^{+3}$—$Mn^{+7}$ couple, a $Sn^{+2}$—Sn couple, and combinations thereof.

The gas diffusion layer is comprised of fluorinated carbon particles fluorinated in the range of 19 to 68 weight percent. The fluorinated carbon particles may be at least partially coated with a hydrophobic component, such as polytetrafluoroethylene wherein the gas diffusion layer includes 10 to 25 percent by weight of polytetrafluoroethylene.

The gas diffusion layer has a gas contacting surface and an electrolyte contacting surface. The polytetrafluoroethylene may be continually graded from a high concentration at the electrolyte contacting surface of the gas diffusion layer to a low concentration at the gas contacting surface of the gas diffusion layer. The fluorinated carbon particles may also be continually graded throughout the gas diffusion layer from a high fluoride concentration at the electrolyte contacting surface of the gas diffusion layer to a low fluoride concentration at the gas contacting surface of said gas diffusion layer.

The hydrogen storage material used in the active material in the case of a hydrogen electrode is a hydrogen storage alloy selected from the group consisting of rare-earth/Misch metal alloys, zirconium alloys, titanium alloys, and mixtures or alloys thereof. Preferably the hydrogen storage alloy has the following composition: $(Mm)_a Ni_b Co_c Mn_d Al_e$ where Mm is a Misch Metal comprising 60 to 67 atomic percent La, 25 to 30 weight percent Ce, 0 to 5 weight percent Pr, 0 to 10 weight percent Nd; b is 45 to 55 weight percent; c is 8 to 12 weight percent; d is 0 to 5.0 weight percent; e is 0 to 2.0 weight percent; and a+b+c+d+e=100 weight percent.

The carbon matrix as used in an oxygen electrode may comprise a plurality of carbon particles at least partially coated with polytetrafluoroethylene. The polytetrafluoroethylene coated carbon particles contains 15 to 25 percent polytetrafluoroethylene by weight. Alternatively, the carbon particles may be replaced or combined with fluorinated carbon particles fluorinated in the range of 19 to 68 percent by weight. In such case, the amount of polytetrafluoroethylene may be reduced accordingly. The carbon matrix further comprises 0 to 30 percent by weight of a peroxide decomposer. The peroxide decomposer may be selected from $MnO_2$, MnO, cobalt oxides, nickel oxides, iron oxides, and mixtures thereof.

The electrode also includes a first current collector grid disposed adjacent to said gas diffusion layer opposite the active material layer and a second current collector grid disposed adjacent to the active material layer opposite the gas diffusion layer. The first current collector grid and the second current collector grid may be a mesh, grid, matte, expanded metal, foil, foam, plate, and combinations thereof.

DETAILED DESCRIPTION OF THE INVENTION

The present invention discloses electrodes having a controlled hydrophobicity throughout the gas diffusion layer. Such electrodes may be used in either fuel cells or batteries. By using fluorinated carbon, the gas diffusion layer demonstrates a uniform network with controlled hydrophobicity. The fluorinated carbon as described in the present invention may be used in the gas diffusion layer of both the hydrogen electrode and the oxygen electrode.

The gas diffusion layer in accordance with the present invention is generally comprised of fluorinated carbon and polytetrafluoroethylene. The fluorinated carbon has the general formula $CF_x$, wherein X may be varied as the carbon is fluorinated to different levels. The carbon may be fluorinated in the range from 19 to 68 weight percent. The fluorinated carbon has a good surface area and is inherently hydrophobic. Once fluorinated, the carbon is increasingly resistant to corrosion or degradation within the fuel cell. The fluorinated carbon is also much easier to coat with polytetrafluoroethylene thus allowing a much more uniform gas diffusion layer.

Figure 1:
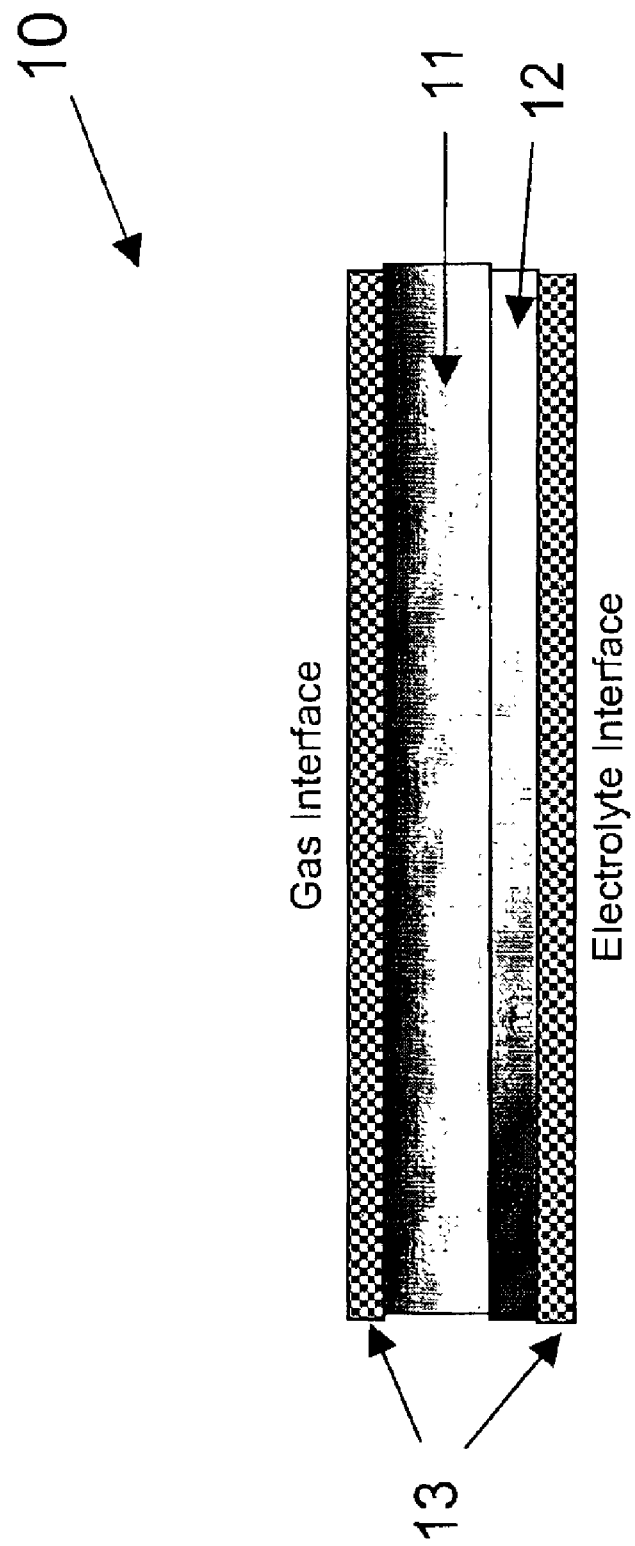
FIG. 1, exemplifies an electrode in accordance with the present invention.

An electrode having a gas diffusion layer in accordance with the present invention is exemplified in FIG. 1. In the case of an oxygen electrode, the layered structure promotes oxygen dissociation and absorption within the oxygen electrode. When used in a hydrogen electrode, the gas diffusion layer uniformly distributes hydrogen to the active material layer which dissociates and absorbs the hydrogen. The electrode 10 is composed of a gas diffusion layer 11, an active material layer 12, and two current collector grids 13. The gas diffusion layer and the active material layer are placed adjacent to one another with the current collector grids 13 being placed outside the gas diffusion layer 11 and active material layer 12 thereby forming a sandwich configuration. When used inside a fuel cell, the current collector grid in contact with the active material layer 12 is in contact with the electrolyte stream while the current collector grid in contact with the gas diffusion layer 11 is in contact with the air or oxygen stream.

During operation, the electrolyte stream enters the active material layer of the electrode. The electrode therefore needs a barrier means to isolate the electrolyte, or wet, side of the electrode from the gaseous, or dry, side of the electrode. A beneficial means of accomplishing this is by preparing a gas diffusion layer comprising fluorinated carbon and a hydrophobic halogenated organic polymer compound, particularly polytetrafluoroethylene (PTFE). With this in mind, the gas diffusion layer 11 is primarily a fluorinated carbon matrix composed of fluorinated carbon particles at least partially coated with polytetrafluoroethylene. The fluorinated carbon is fluorinated in the range of 19 to 68 percent by weight. The fluorinated carbon matrix is in intimate contact with a current collector grid which provides mechanical support to the fluorinated carbon matrix. The fluorinated carbon particles may be Carbofluor $CF_x$ (Trademark of Lithchem International Corp.), which is well known in the art. The gas diffusion layer may contain approximately 10 to 25 percent by weight polytetrafluoroethylene with the remainder consisting of fluorinated carbon particles. The polytetrafluoroethylene may be uniform throughout the gas diffusion layer or may be continually graded with the highest polytetrafluoroethylene concentration being at the electrolyte contacting surface of the gas diffusion layer.

The active material layer 12 in an oxygen electrode may be composed of a carbon matrix composed of polytetrafluoroethylene coated carbon particles and a peroxide decomposer with an active catalyst material 14 impregnated within the carbon matrix. The oxygen electrode active material layer has a lower level of hydrophobicity than the gas diffusion layer. Fluorinated carbon may also be used in the active material layer to reduce the amount of polytetrafluoroethylene used in the active material layer. The carbon matrix is in intimate contact with a current collector grid which provides mechanical support to the carbon matrix. The carbon particles in the B layer may be carbon black known as Black Pearl 2000 (Trademark of Cabot Corp.). The carbon particles are coated with polytetrafluoroethylene wherein the teflonated carbon particles preferably contain approximately 15 to 25 percent polytetrafluoroethylene by weight. The amount of manganese dioxide may vary in the carbon matrix depending on design conditions. The carbon matrix may contain 0–30 weight percent of a peroxide decomposer. The peroxide decomposer may be $MnO_2$, MnO, cobalt oxide, nickel oxide, iron oxide, or a mixture thereof. The peroxide decomposer is added to the carbon matrix to help improve stability of the oxygen electrode. Stability of the oxygen electrode is adversely affected by hydrogen peroxide formed as a byproduct of the reduction of oxygen. The peroxide decomposer eliminates the hydrogen peroxide thereby maintaining stability within the oxygen electrode. Preferably, MnO is used to promote better stability within the oxygen electrode as compared to $MnO_2$. The MnO reacts to form $MnO_2$ in a reversible oxidation reaction whereas the $MnO_2$ undergoes oxidation and remains at an even higher oxidation state.

The active catalyst material deposited in the active material layer of the oxygen electrode may be a redox couple providing valency change. The active catalyst material may comprise 5 to 25 percent by weight of the active material layer. Numerous redox couples exist and may be used alone or in combination in the oxygen electrode active material layer. When used in combination, the redox couples may complement one another to provide improved kinetics within the oxygen electrode. The improved kinetics within the oxygen electrode are a result of the multiple redox couples assisting each other synergistically. When such couples are used, cycling transition from the oxidized form to the reduced form is accomplished repeatedly and continuously. From a practical point of view, the ability to withstand such cycling is preferred. Following is a nonexclusive list of potential redox couples that may be used alone or in combination in the oxygen electrode in accordance with the present invention.

$Co^{+2} \leftrightarrows Co^{+3}$ (Valency level 2 to a valency level 3) $Co(OH)_2 + OH^- \rightarrow CoOOH + H_2O + e^-$ \hfill (1)

$Co^{+2} \leftrightarrows Co^{+4}$ (Valency level 2 to a valency level 4) $Co(OH)_2 + 2OH^- \rightarrow Co(OH)_4 + 2e^-$ $Co(OH)_4 \rightarrow CoO_2 + 2H_2O$ \hfill (2)

$Ni^{+2} \leftrightarrows Ni^{+3}$ (Valency level 2 to a valency level 3) $Ni(OH)_2 + OH^- \rightarrow NiOOH + H_2O + e^-$ \hfill (3)

$Ni^{+2} \leftrightarrows Ni^{+4}$ (Valency level 2 to a valency level 4) $Ni(OH)_2 + 2OH^- \rightarrow Ni(OH)_4 + 2e^-$ $Ni(OH)_4 = \rightarrow NiO_2 + 2H_2O$ \hfill (4)

$Ag \leftrightarrows Ag^+$ (Valency level 0 to valency level 1) $2Ag + 2OH^- \rightarrow Ag_2O + H_2O + e^-$ \hfill (5)

$Ag \leftrightarrows Ag^{12}$ (Valency level 0 to valency level 2) $Ag + 2OH^- \rightarrow AgO + H_2O + 2e^-$ \hfill (6)

$Cu \leftrightarrows Cu^{12}$ (Valency level 0 to valency level 2) $Cu + 2OH^- \rightarrow CuO + H_2O + 2e^-$ \hfill (7)

$(Ni/Ag)^{+2} \leftrightarrows (Ni/Ag)$ \hfill (8)

$(Ni/Fe)oxide^{+2} \leftrightarrows (Ni/Fe)oxide^{+3}$ \hfill (9)

$Mn^{+2} \leftrightarrows Mn^{+3} \leftrightarrows Mn^{+7}$ \hfill (10)

$Sn^{+2} \leftrightarrows Sn^{+4}$ \hfill (11)

Groups 8, 9, 10, and 11 are comprised of multiple elements having multiple valency states.

Amphoteric elements like aluminum, boron, and silicon may also be used when incorporated into appropriate chemical compounds to suppress their solubility in alkaline solutions contacting the oxygen electrode. Various mixed oxides, sulfides, and halides may also be used where any of the above mentioned reactions, alone or in combination, have a valency change linked to them.

In all of the previously described reactions, the overall reaction is still oxygen reduction. In these reactions the pathway chosen may not be a direct electrochemical reduction of $O_2$, but via a redox reaction. This gives another degree of freedom to choose the right redox reaction, matching the kinetics and the operating potential desired.

The oxygen electrodes may contain an active material component which is catalytic to the dissociation of molecular oxygen into atomic oxygen, catalytic to the formation of hydroxyl ions ($OH^-$) from water and oxygen ions, corrosion resistant to the electrolyte, and resistant to poisoning. A material useful as an active material in the oxygen electrode is on a host matrix including at least one transition metal element which is structurally modified by the incorporation of at least one modifier element to enhance its catalytic properties. Such materials are disclosed in U.S. Pat. No. 4,430,391 ('391) to Ovshinsky, et al., published Feb. 7, 1984, the disclosure of which is hereby incorporated by reference. Such a catalytic body is based on a disordered non-equilibrium material designed to have a high density of catalytically active sites, resistance to poisoning and long operating life. Modifier elements, such as La, Al, K, Cs, Na, Li, Ga, C, and O structurally modify the local chemical environments of the host matrix including one or more transition elements such as Mn, Co and Ni to form the catalytic materials of the oxygen electrode. These low over-voltage, catalytic materials increase operating efficiencies of the fuel cells in which they are employed.

Reactive elements such as lithium may be added to the redox couple in the form of a non-reactive alloy such as a LiAl alloy. That is, lithium alone as an individual element is extremely reactive with oxygen and water vapor, therefore it is advisable to incorporate the element into the redox couple in the form of an alloy with aluminum which is not reactive in this way. Other elements which may be alloyed with the lithium include boron and silicon. Specifically the LiAl alloy may be a 50:50 At. % alloy.

The active material layer 12 in a hydrogen electrode is a hydrogen storage material optionally including a catalytic material. The preferable active material layer is one which can reversibly absorb and release hydrogen irrespective of the hydrogen storage capacity and has the properties of a fast hydrogenation reaction rate, a good stability in the electrolyte, and a long shelf-life. It should be noted that, by hydrogen storage capacity, it is meant that the material stores hydrogen in a stable form, in some nonzero amount higher than trace amounts. Preferred materials will store about 1.0 weight % hydrogen or more. Preferably, the alloys include, for example, rare-earth/Misch metal alloys, zirconium and/or titanium alloys or mixtures thereof (wherein, Misch metal is a rare-earth metal or combination/alloy of rare-earth metals). The active material layer may even be layered such that the material on the hydrogen contacting surface of the active material layer is formed from a material which has been specifically designed to be highly catalytic to the dissociation of molecular hydrogen into atomic hydrogen, while the material on the electrolyte contacting surface is designed to be highly catalytic to the formation of water from hydrogen and hydroxyl ions.

Certain hydrogen storage materials are exceptionally useful as alkaline fuel cell hydrogen electrode materials. The useful hydrogen storage alloys have excellent catalytic activity for the formation of hydrogen ions from molecular hydrogen and also have superior catalytic activity toward the formation of water from hydrogen ions and hydroxyl ions. In addition to having exceptional catalytic capabilities, the materials also have outstanding corrosion resistance toward the alkaline electrolyte of the fuel cell. In use, the alloy materials act as 1) a molecular hydrogen decomposition catalyst throughout the bulk of the hydrogen electrode; and 2) as an internal hydrogen storage buffer to insure that a ready supply of hydrogen atoms is always available at the electrolyte contacting surface.

Specific alloys useful as the anode material are alloys that contain enriched catalytic nickel regions of 50–70 Angstroms in diameter distributed throughout the oxide interface which vary in proximity from 2–300 Angstroms preferably 50–100 Angstroms, from region to region. As a result of these nickel regions, the materials exhibit significant catalysis and conductivity. The density of Ni regions in the alloys provide powder particles having an enriched Ni surface. The most preferred alloys having enriched Ni regions are alloys having the following composition:

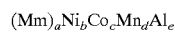

where Mm is a Misch Metal comprising 60 to 67 atomic percent La, 25 to 30 weight percent Ce, 0 to 5 weight percent Pr, 0 to 10 weight percent Nd; b is 45 to 55 weight percent; c is 8 to 12 weight percent; d is 0 to 5.0 weight percent; e is 0 to 2.0 weight percent; and a+b+c+d+e=100 weight percent.

The current collector grids in accordance with the present invention may be selected from, but not limited to, an electrically conductive mesh, grid, foam or expanded metal. The most preferable current collector grid is an electrically conductive mesh having 40 wires per inch horizontally and 20 wires per inch vertically, although other meshes may work equally well. The wires comprising the mesh may have a diameter between 0.005 inches and 0.01 inches, preferably between 0.005 inches and 0.008 inches. This design provides optimal current distribution due to the reduction of the ohmic resistance. Where more than 20 wires per inch are vertically positioned, problems may be encountered when affixing the active material to the substrate. One current collector grid may be used in accordance with the present invention, however the use of two current collector grids is preferred thus increasing the mechanical integrity of the oxygen electrode.

The gas diffusion layer of the present invention may also be applied and be advantageous for use in batteries where hydrophobicity and decomposition of hydrophobic materials incorporated therein are of importance.

EXAMPLE 1

A oxygen electrode was made using a gas diffusion layer in accordance with the present invention. Fluorinated carbon and polytetrafluoroethylene were mixed together where the fluorinated carbon composes 85 weight percent of the mixture and the polytetrafluoroethylene composed the remaining 15 weight percent of the mixture. The mixture was thoroughly mixed in a laboratory high speed mill for 30 seconds. The resulting mixture was distributed using a powder dispenser between two compression rollers producing a gas diffusion layer with a thickness of 0.018 to 0.02 inches. The resulting ribbon was then used as the gas diffusion layer in an oxygen electrode.

The active material layer was prepared by first preparing a carbon matrix. The carbon matrix is composed of carbon particles coated with PTFE. The carbon particles were mixed with the polytetrafluoroethylene in the same manner used in preparing the gas diffusion layer. The carbon particles are preferably carbon black particles known as Black Pearl 2000 (Trademark of Cabot Corp.) which is well known in the art. The carbon/PTFE black mixture contains approximately 20 percent polytetrafluoroethylene by weight with the remainder being carbon black particles. The resulting mixture was distributed using a powder dispenser between two compression rollers producing a ribbon with a thickness of 0.018 to 0.020 inches. The resulting ribbon was then used as the active material layer in an oxygen electrode.

The two ribbons were then placed back to back between two current collector grids and rolled again. The active material layer was then chemically impregnated with Ag (the active catalyst material).

Figure 2:
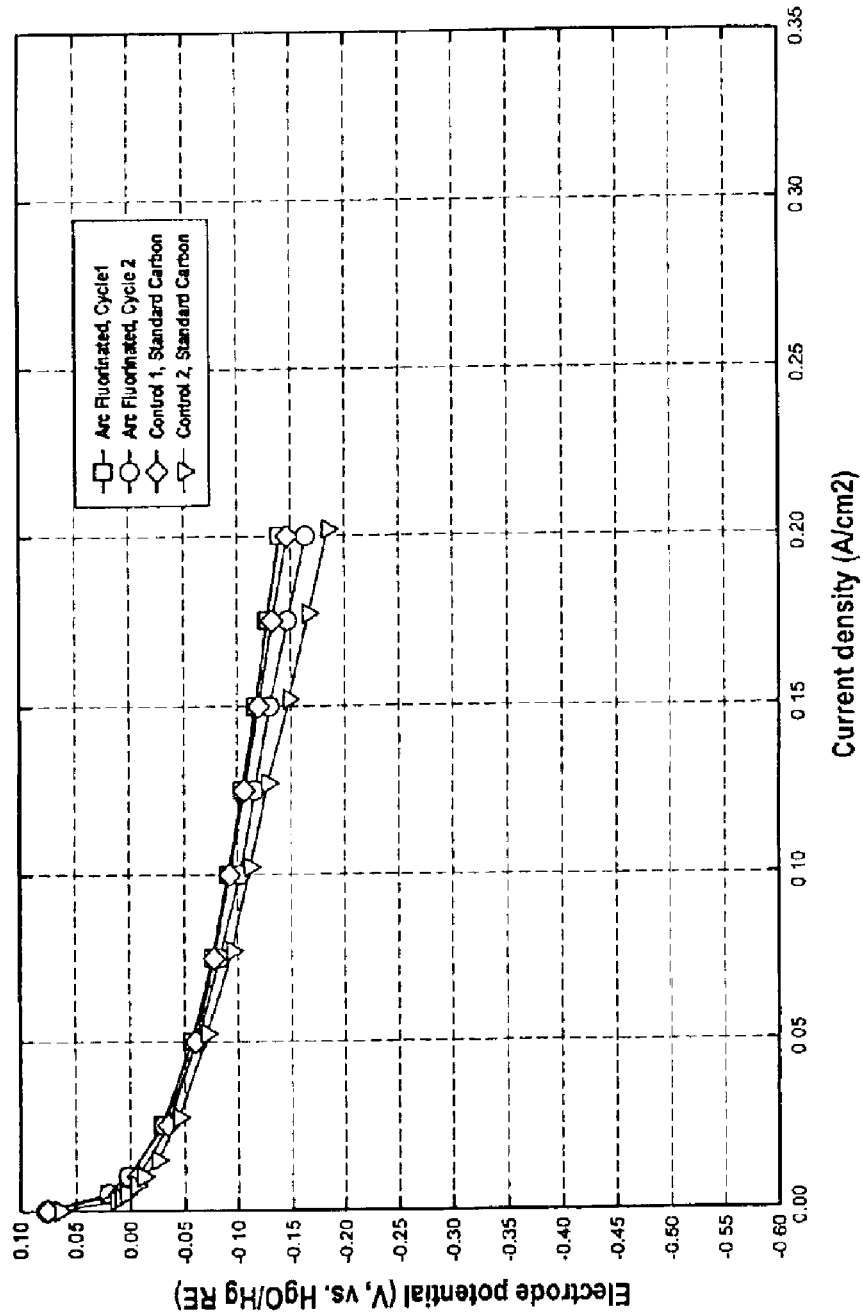
FIG. 2, is a plot of the current density versus the electrode potential for an oxygen electrode in accordance with the present invention.
Figure 3:
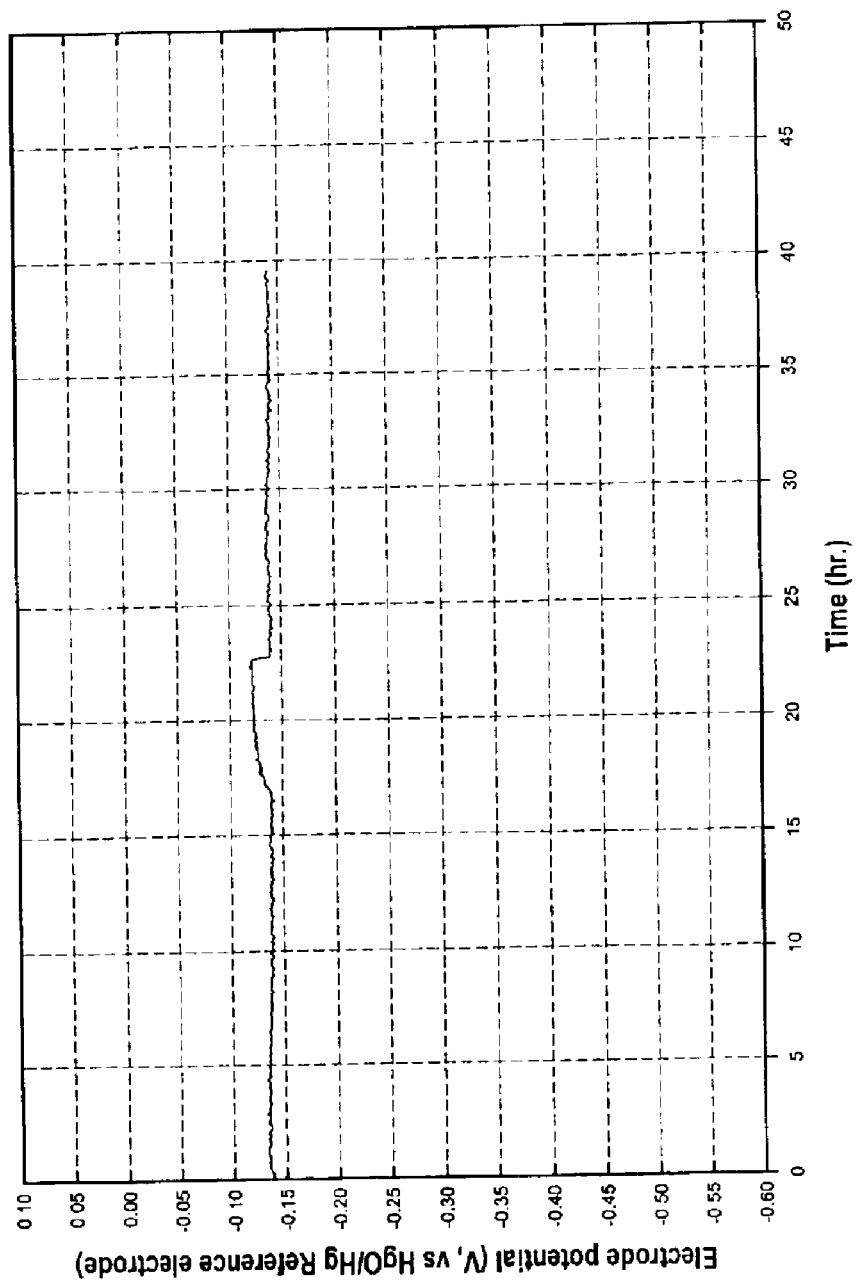
FIG. 3, is a plot of electrode potential versus time at a discharge rate of −1.5 A for an oxygen electrode in accordance with the present invention.

The oxygen electrode was then tested and compared to conventional oxygen electrodes. FIG. 2. shows the oxygen electrode polarization curve for the oxygen electrode utilizing fluorinated carbon in the gas diffusion layer (□-$1^{st}$ cycle, ○-$2^{nd}$ cycle) as compared to oxygen electrodes utilizing standard carbon in the gas diffusion layer (◇, ▽). The plot demonstrates that the performance of the oxygen electrode is not affected by the use of fluorinated carbon instead of standard carbon. FIG. 3 shows a plot of the electrode potential versus time for an oxygen electrode with fluorinated carbon substituted for standard carbon in the gas diffusion layer. The plot demonstrates that the oxygen electrode with fluorinated carbon remains stable during discharge over extended periods of time.

The foregoing is provided for purposes of explaining and disclosing preferred embodiments of the present invention. Modifications and adaptations to the described embodiments, particularly involving changes to the shape and design of the hydrogen electrode, the type of active material, and the type of carbon used, will be apparent to those skilled in the art. These changes and others may be made without departing from the scope or spirit of the invention in the following claims.

What is claimed is:

1. In a fuel cell, an electrode comprising:
   a fluorinated carbon based gas diffusion layer having a built in hydrophobicity; and
   an active material layer adjacent to said gas diffusion layer wherein said active material layer comprises a carbon matrix including a redox couple selected from the group consisting of a $Co^{+2}$—$Co^{+3}$ couple, a $Co^{+2}$—$Co^{+4}$ couple, a $Ni^{+2}$—$Ni^{+3}$ couple, a $Ni^{+2}$—$Ni^{+4}$ couple, a Ag—$Ag^+$ couple, a Ag—$Ag^{+2}$ couple, a Cu—$Cu^{+2}$ couple, a $(Ni/Ag)^{+2}$—(Ni/Ag) couple, a (Ni/Fe) oxide$^{+2}$—(Ni/Fe) oxide$^{+3}$ couple, a $Mn^{+2}$—$Mn^{+3}$—$Mn^{+7}$ couple, a $Sn^{+2}$—Sn couple, and combinations thereof.

2. The electrode according to claim 1, wherein said gas diffusion layer comprises a plurality of fluorinated carbon particles.

3. The electrode according to claim 2, wherein said fluorinated carbon particles are 19 to 68 weight percent fluorinated.

4. The electrode according to claim 3, wherein said plurality of fluorinated carbon particles are at least partially coated with a hydrophobic component.

5. The fuel cell oxygen electrode of claim 4, wherein said hydrophobic component comprises polytetrafluoroethylene (PTFE).

6. The electrode according to claim 4, wherein said gas diffusion layer includes 10 to 25 percent by weight of said hydrophobic component.

7. The electrode according to claim 4, wherein said gas diffusion layer has a gas contacting surface and an electrolyte contacting surface.

8. The electrode according to claim 7, wherein said hydrophobic component is continually graded from a high concentration at said electrolyte contacting surface of said gas diffusion layer to a low concentration at said gas contacting surface of said gas diffusion layer.

9. The electrode according to claim 7, wherein said fluorinated carbon particles are continually graded throughout said gas diffusion layer from a high fluorine concentration at said electrolyte contacting surface of said gas diffusion layer to a low fluorine concentration at said gas contacting surface of said gas diffusion layer.

10. The electrode according to claim 1, wherein said carbon matrix comprises a plurality of carbon particles.

11. The electrode according to claim 10, wherein said plurality of carbon particles are at least partially coated with polytetrafluoroethylene.

12. The electrode according to claim 11, wherein said plurality of polytetrafluoroethylene coated carbon particles contains 15 to 25 percent polytetrafluoroethylene by weight.

13. The electrode according to claim 10, wherein said carbon matrix further comprises 0 to 30 percent by weight of a peroxide decomposer.

14. The electrode according to claim 13, wherein said peroxide decomposer is selected from a group consisting of $MnO_2$, MnO, cobalt oxides, nickel oxides, iron oxides, and mixtures thereof.

15. The electrode according to claim 1, wherein said carbon matrix comprises a plurality of fluorinated carbon particles.

16. The electrode according to claim 15, wherein said plurality of carbon particles are at least partially coated with polytetrafluoroethylene.

17. The electrode according to claim 16, wherein said plurality of polytetrafluoroethylene coated carbon particles contains 15 to 25 percent polytetrafluoroethylene by weight.

18. The electrode according to claim 15, wherein said carbon matrix further comprises 0 to 30 percent by weight of a peroxide decomposer.

19. The electrode according to claim 18, wherein said peroxide decomposer is selected from a group consisting of $MnO_2$, MnO, cobalt oxides, nickel oxides, iron oxides, and mixtures thereof.

20. The electrode according to claim 1, further comprising:
    a first current collector grid disposed adjacent to said gas diffusion layer opposite said active material layer; and
    a second current collector grid disposed adjacent to said active material layer opposite said gas diffusion layer.

21. The electrode according to claim 20, wherein said first current collector grid and said second current collector grid each comprise at least one selected from the group consisting of mesh, grid, matte, expanded metal, foil, foam, plate, and combinations thereof.

* * * * *